United States Patent Office 3,307,884
Patented Mar. 7, 1967

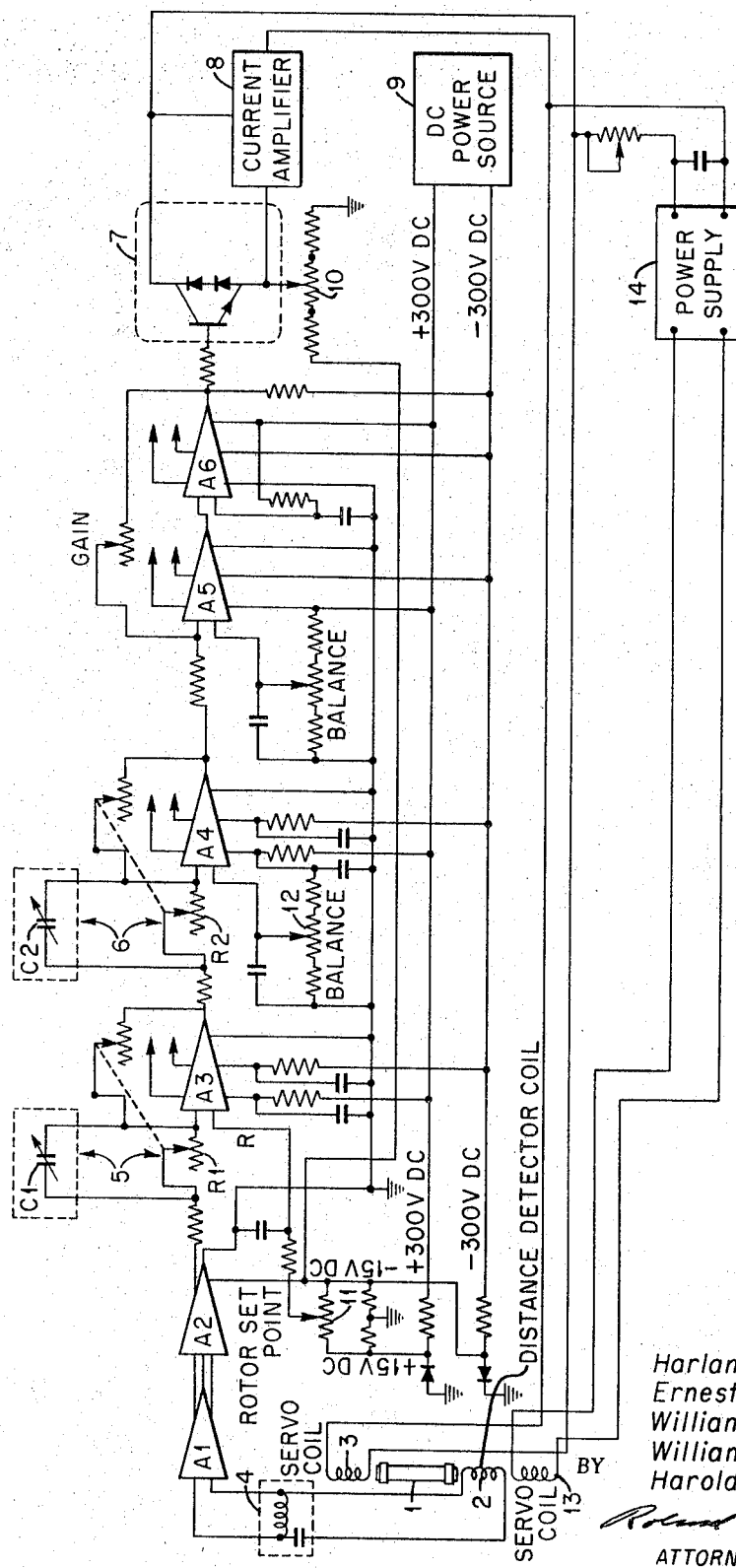

3,307,884
CONTROL SYSTEM FOR MAGNETIC SUSPENSION OF CENTRIFUGE ROTORS
Harlan F. Dunlap, Concord, Ernest C. Evans and William G. S. Fort, Oak Ridge, William Smith, Rockwood, and Harold A. Kermicle, Oak Ridge, Tenn., assignors to the United States of America as represented by the United States Atomic Energy Commission
Filed Oct. 8, 1964, Ser. No. 402,665
3 Claims. (Cl. 308—10)

ABSTRACT OF THE DISCLOSURE

A control system for magnetically suspending and for automatically maintaining a centrifuge rotor in a selected suspended position includes a first servo coil positioned above the rotor to suspend the rotor which is rotated by a rotating magnetic field. Also, a proximity or distance detector coil is positioned beneath the rotor for generating a signal proportional to any vertical movement of the rotor, and a second servo coil is positioned beneath the rotor. The servo coils are magnetically coupled in aiding relationship. A control circuit connected to the detector coil provides a first and second time derivative of the error in rotor position and the control circuit output modifies the current through the first servo coil to stabilize the rotor position. Undesirable low frequency signals generated in the detector coil by the rotor drive motor rotating magnetic field are filtered out before reaching the control circuit.

The present system has various applications, but for brevity will be illustrated herein as used to position a rotor of the kind used in a zonal ultracentrifuge for liquids. The particular rotor referred to is designated as the D–1 rotor. Such a rotor is described in the special report, ORNL–3502, page 43, issued October 11, 1963. The rotor is composed of steel and is in the form of a hollow right circular cylinder. As used for optical studies, the rotor is provided with transparent end plugs and with ferromagnetic end caps which are threaded onto the ends of the rotor. A typical rotor of this type is 3.75 inches long, 0.65 inch in diameter, and weighs 197 grams when filled with a typical solution of interest. The rotor is driven by induction, a multiphase stator coil being mounted about the rotor. A magnetic suspension system for the rotor is especially advantageous for optical studies because, unlike the usual support systems utilizing shafts or wires, it permits essentially unrestricted viewing of the interior of the rotor. The other advantages of a magnetic support system are clearly presented in the following publications: Beams, J. W., "Magnetic Suspensions for High-Speed Rotors," Machine Design, vol. 56, No. 6, March 12, 1964.

The systems set forth in the above publication have several disadvantages of which the present invention was designed to overcome. These prior disadvantages may be listed as follows: (1) Such systems have utilized vacuum tube output circuits with low output current control. (2) Such prior systems are not provided with means for minimizing the effects of spurious signals generated in the proximity coil by the rotating magnetic field of the drive motor for the rotor. (3) Such prior systems are not provided with means for radially stabilizing the lower end of the vertically oriented rotor during operation.

With a knowledge of the limitations of the prior suspension control systems for centrifuge rotors, it is a primary object of the present invention to provide a control system for the magnetic suspension of high-speed centrifuge rotors which permits superior control of the vertical excursions of the rotor by generating a restoring voltage which is essentially proportional, not only to the error in the rotor position, but to the first and second time derivatives of this error, this restoring voltage providing a high current compared to conventional vacuum tube control circuits.

It is another object of the present invention to provide a control system as in the preceding object and further including means for minimizing the effects of spurious signals generated in the proximity coil by the rotating magnetic field of the drive motor for the rotor.

It is still another object of the present invention to provide a control system as in the preceding objects and further including means for radially stabilizing the rotor during operation of the centrifuge.

These and other objects and advantages of the present invention will become apparent upon a consideration of the following detailed specification and the accompanying drawing wherein:

The single figure is a schematic wiring diagram of the control system of the present invention.

The above objects have been accomplished in the present invention by providing a first servo coil to suspend the centrifuge rotor which is rotated by a rotating magnetic field, providing a proximity or distance detector coil beneath the rotor to generate a signal voltage proportional to the amount of vertical movement of the rotor away from a pre-set operating position, providing a second servo coil beneath the rotor which is magnetically coupled to said first servo coil in an aiding relationship and which is 180° out of phase with said first coil electrically, providing a control circuit connected to the detector coil, including means for obtaining the first and second time derivatives of the error in rotor position, the output of this control circuit being used to modify the current through the first servo coil to stabilize the rotor position, and providing means connected between the detector coil and the control circuit for filtering out low frequency signals up to 2000 cycles which are generated in the detector coil by the rotating magnetic field of the drive motor for the rotor. In this mode of control, the net flux averaged in time and space through the rotor is a constant, but the flux gradients at the top and bottom of the rotor differ.

Referring now to the drawings, the overall control system is shown schematically. A vertically oriented D–1 rotor 1 has a proximity or distance detector coil 2 and a servo coil 13 mounted below the rotor and a low-inductance, fast-response servo suspension coil 3 mounted above the rotor. The servo coil 3, which is in a closed magnetic coupling with the servo coil 13, has two functions: (1) to electromagnetically suspend the rotor 1 in a desired operating position and, (2) in response to positioning signals received from the control circuit, to vary the electromagnetic attraction as required to minimize vertical excursion of the rotor by providing the control circuit with an input signal proportional to the amount of excursion.

During calibration of the system the rotor is placed manually in the desired operating position and the currents through the coils 3 and 13 are adjusted to the value required to suspend the rotor 1 in that position. The automatic control circuit, to be described below, is then adjusted to respond to incipient vertical movements of the rotor by instantly modifying the servo coil currents so as to maintain the rotor in the desired position.

The detector coil 2 is of the open-centered type and comprises 30 turns of No. 26 wire. The servo coils 3 and 13 have hollow iron cores, are of the open-centered type, and are mounted to be in vertical alignment with the coil 2 and the rotor 1. The coils 3 and 13 are iron core coils with a C-shaped magnetic structure, not shown, supporting the coils to provide a closed magnetic coupling. Coils 3 and 13 each have 125 turns of No. 16 wire. The detector coil 2 is connected as part of a standard proximity-type distance-detector arrangement which includes a high-frequency oscillator detector A1 whose output is delivered to an impedance-matching amplifier A2. A high-pass electrical filter 4, which is not a part of the standard distance detector, is connected between the coil 2 and the oscillator detector to block the low-frequency voltage which normally is induced in the proximity coil 2 by the rotating field of the rotor drive motor, not shown. The filter 4 efficiently blocks up to 2000-cycle pickup signals while passing the oscillator carrier frequency which is about 2 mc.

Assuming that the system has been calibrated, a slight downward movement of the rotor 1 from its desired position changes the "Q" of the detector coil 2. This changes the tuning of the oscillator, producing a proportional decrease in the normal negative D.C. output from the oscillator detector A1. That is, the A1 output voltage is driven less negative by an amount proportional to the distance which the rotor has moved downward. This effect is reflected in the D.C. output voltage of the operational amplifier A2, which operates at unity gain, but which converts the output of A1 to a much lower impedance. The output from A2 is fed into a network 5, to be described below, where the voltage decrease resulting from the downward movement of the rotor is differentiated. As a result of differentiation, the decrease in the A2 output voltage at the output terminal of network 5 is limited to an amount essentially proportional to the first time derivative of the distance the rotor has moved downward, as well as to the distance itself.

As indicated in the drawing, a standard power supply 9 provides two stable voltages, $+300$ volts D.C. and $-300$ volts D.C., with respect to ground. A network including a potentiometer 11 is connected across power supply 9. Two zener diodes SZ 855 and two 30K resistors are utilized to maintain one leg of the network 11 at $+15$ volts D.C. and the other leg at $-15$ volts D.C. A network including a potentiometer 10 is connected to the $-15$ volt D.C. output of network 11. During calibration of the system, the potentiometer 10 is set manually to adjust the bias on a transistor gate 7, the bias being adjusted so that the current output from a solid-state, high-current programmable power supply 8 connected to the coil 3 and connected to the coil 13 and the power supply 14 through a filter network is just sufficient to suspend the rotor 1 in the desired operating position, in a manner to be described below. The power-supply 8 is operated in the voltage-control mode.

The potentiometer 11 is used to set the reference voltage R, applied to one input terminal of the difference amplifier A3. The other input to the difference amplifier A3 is from the differentiating network 5. The network 5 comprises a condenser C1 and a resistor R1, both of which are adjustable. Note that R1 is ganged to an adjustable 1-meg resistor in the feedback circuit for amplifier A3. With this arrangement, the time constant of network 5, and therefore the amount of first derivative damping, can be adjusted without changing the gain setting of amplifier A3.

During calibration of the system and with the rotor 1 in the desired operating position, the reference voltage R from network 11 is set equal to the D.C. voltage from amplifier A2 after differentiation of the latter by the network 5. The difference between the A2 voltage after differentiation and the reference voltage R comprises the input voltage to the analog operational amplifier A3. Thus, whenever the rotor 1 is in the desired operation position, the differential input to amplifier A3 is essentially zero; consequently, the currents through the suspension coils 3 and 13 are at a steady-state value determined by the setting of the potentiometer 10.

Any output from amplifier A3, which is connected for unity gain, is a D.C. voltage proportional to the error in rotor position and to the first time derivative of this error. The output from A3 is fed through a 100K ohm resistor to a network 6 where it is partially differentiated by this network and then fed into another unity-gain operational amplifier A4. The network 6 is analogous to network 5, and includes an adjustable condenser C2, an adjustable resistor R2, and an adjustable 1-meg feedback resistor for the amplifier A4. A balance potentiometer 12 is provided for setting the zero level of the amplifier A4. Any D.C. output from amplifier A4 is essentially proportional to the error in the rotor position and to the first and second time derivatives of this error. The output from amplifier A4 is fed into a series combination of operational amplifiers A5 and A6, which together function as a power-boosting amplifier with low output impedance. The D.C. output voltage from amplifier A6 operates the transistorized gate 7 for the solid-state power supply 8. A 5-meg resistor is provided as an overall gain adjustment for the power-amplifying arrangement of amplifiers A5 and A6. The output of amplifier A6 is coupled to the gate 7 by a 14.7K resistor. The width of the gate is proportional to the current flow through this resistor. Depending on the sense of the A6 output voltage, the gate 7 proportionally increases or decreases the power supply 8 output.

The output of power supply 8, modified as necessary by the derivative networks, is fed directly to the servo coil 3. The output of supply 8 is also connected through a filter circuit, including a 2.5K ohm adjustable resistor and an 8 mfd. condenser to a power supply 14 and then fed to the lower servo coil 13. Supply 14 is in slave relationship with supply 8 and is 180° out of phase therewith. The filter circuit is used to filter out that portion of the output signal of supply 8 that is caused by the derivative networks 5 and 6, and the unfiltered-out portion of this signal lags the signal to the coil 3. The polarity of the signal to servo coil 3 is reversed to the polarity of the signal to servo coil 13 such that as the current to coil 3 goes up, the current to coil 13 goes down, and vice versa, to maintain the sum of the D.C. currents to coils 3 and 13 constant. As mentioned above, the coils 3 and 13 are magnetically coupled by a magnetic "C" yoke, not shown, to provide a closed magnetic loop such that the coils 3 and 13 cooperate to provide a magnetic suspension for the rotor 1. By maintaining an overall net total current to the coils 3 and 13 at a constant value, as discussed above, the magnetic flux in the rotor is maintained at a substantially constant value, and any derivative control signal to servo coil 3 is used to maintain the rotor 1 in the desired operating position.

To minimize circuit noise, it is preferable to shield all high-impedance leads and the entire first stage of the control circuit. The two time-derivative sections of the circuit are somewhat interdependent. It is preferable, therefore, to make the first of the time constants large with respect to the other, so that the second derivative, which is proportional to the product of the time constants, can be changed appreciably without changing the first derivative. This obviates the need for having separate amplifiers in parallel to give the first and second derivatives. The use of second-derivative control in the present invention provides much better damping than either first-derivative or higher derivative control.

The control system of the present invention has been operated with the rotor 1 rotated at speeds of 270,000 r.p.m. Vertical movements of the rotor were much less than 0.001 inch peak to peak. In the arrangement shown in the drawing, the total net current through the servo coils 3 and 13 should not exceed about 10 amperes at 2-3 volts to avoid saturation of the coils. The current to the suspension coil 3 normally consists of direct current with an alternating current resulting from the operation of the derivative networks.

From the above data obtained in runs made 270,000 r.p.m., it is estimated that the rotor 1 can be accelerated to 400,000 r.p.m., the design speed for this rotor, in less than thirty minutes.

The operation of the control circuit may be summarized in the following equation:

$$\phi_e = G\left[K_1 - K_2 g + (T_1 + T_2)\frac{d}{dt} + T_1 T_2 \frac{d^2}{dt^2}\right]E_1,$$

where:

$\phi_e$ is the effective magnetic flux,

G is the overall proportionate gain factor, $K_1$ is a constant representing the degree to which the flux of the servo coil 3 is effective in suspending the rotor (this factor depends on the position of coil 3 relative to the rotor, the number of turns on the coil, the permeability, etc.), $K_2$ is a corresponding constant for coil 13, g is a complex number whose phase angle and magnitude may vary with frequency with respect to the respective voltages across coils 3 and 13, $T_1$ and $T_2$ are the respective time constants of the networks 5 and 6, and $E_1$ is the voltage difference between the reference voltage R and the output of network 5.

The provision of the servo coil beneath the lower end of the rotor appreciably improves radial stiffness. The use of the second derivative network along with the provision of a high output current from the control circuit permits the use of a low-inductance, fast-response servo coil 3. Also, more accurate control of the position of the centrifuge rotor is made possible by the use of the filter network 4 connected between the coil 2 and the oscillator for filtering out any undesirable low-frequency signals as discussed above.

This invention has been described by way of illustration rather than limitation and it should be apparent that the present invention is equally applicable in fields other than those described. For example, the control system of this invention may be used as a magnetic support of enclosed (gas bearing) pump rotors, and may be useful for rotating devices in the vacuum of space since no lubrication of bearings is required.

What is claimed is:

1. A control system for magnetically suspending a centrifuge rotor and for automatically maintaining the rotor in a selected suspended position comprising a first servo magnetic suspension coil disposed above said rotor and in alignment with the vertical axis of said rotor; a distance detector coil and a second servo coil disposed beneath said rotor and aligned with said rotor axis, said first and second servo coils being coupled by a magnetic yoke to provide a closed magnetic loop, said detector coil providing an output signal proportional to the position of and to any axial movement of said rotor; an amplifier network having first, second, third, fourth, fifth, and sixth stages; a high-pass filter circuit connected between the output of said detector coil and the first stage of said amplifier network; an adjustable source of reference voltage; a first differentiating network connected to the output of the second amplifier stage; means for connecting said reference voltage and the output of said differentiating network to said third amplifier stage to provide a comparison therebetween, said third amplifier stage providing an output error signal proportional to any deviation from a selected rotor position; a second differentiating network connected to the output of said third amplifier stage; a balance potentiometer; means for connecting said potentiometer and the output of said second differentiating network to said fourth amplifier stage to provide a comparison therebetween, said fourth amplifier stage providing an output signal proportional to the error in the rotor position and to the first and second time derivatives of this error; a transistor gate network; a solid-state, high current power supply connected to the output of said gate network; a reference potentiometer connected to said gate network for providing a steady state reference current at the output of said power supply; means for connecting the output of said power supply to said first rotor servo coil; means connected to the output of said power supply for reversing the polarity thereof, for filtering out any derivative control signals therefrom, and for feeding the resulting signal to said second servo coil; and means for connecting the output of said sixth amplifier stage to the input of said gate network, whereby any rotor position error signal appearing at the output of said sixth amplifier stage modifies the gate network output signal thereby automatically varying the current input to said first rotor servo coil to maintain said rotor in a predetermined selected position, the net total current to both said servo coils being maintained at a constant value to thereby provide a substantially constant magnetic flux in said closed loop.

2. A control system for magnetically suspending a centrifuge rotor and for automatically maintaining the rotor in a selected suspended position comprising a first servo magnetic suspension coil disposed above said rotor and in alignment with the vertical axis of said rotor; a distance detector coil and a second servo coil disposed beneath said rotor and aligned with said rotor axis, said first and second servo coils being coupled by a magnetic yoke to provide a closed magnetic loop, said detector coil providing an output signal proportional to the position of and to any axial movement of said rotor; a multistage amplifier network connected to the output of said detector coil, said amplifier network including means for providing an output signal proportional to any error in a selected rotor position and to the first and second time derivatives of this error; a transistor gate network; a solid-state, high current power supply connected to the output of said gate network; a reference potentiometer connected to said gate network for providing a steady state reference current at the output of said power supply; means for connecting the output of said power supply to said first rotor servo coil; means connected to the output of said power supply for reversing the polarity thereof, for filtering out any derivative control signals therefrom, and for feeding the resulting signal to said second servo coil; and means for connecting the output of said amplifier network to the input of said gate network, whereby any rotor position error signal appearing at the output of said amplifier network modifies the gate network output signal thereby automatically varying the current input to said first rotor servo coil to maintain said rotor in a predetermined selected position, the net total current to both said servo coils being maintained at a constant value to thereby provide a substantially constant magnetic flux in said closed magnetic loop.

3. The control system set forth in claim 2, wherein a high-pass filter circuit is connected between the output of said detector coil and the input to said amplifier network, said filter circuit blocking up to 2000-cycle pickup signals that may be induced in said detector coil.

References Cited by the Examiner

UNITED STATES PATENTS

| | | | |
|---|---|---|---|
| 3,090,239 | 5/1963 | Dacus | 308—10 |
| 3,112,962 | 12/1963 | Lautzenhiser | 308—10 |
| 3,124,962 | 3/1964 | Hirtreiter | 308—10 |
| 3,215,901 | 11/1965 | Carniol | 308—10 |

MILTON O. HIRSHFIELD, *Primary Examiner.*

L. L. SMITH, *Assistant Examiner.*